United States Patent Office 3,431,328
Patented Mar. 4, 1969

3,431,328
METHOD OF MAKING A STRONTIUM-90 RADIATION SOURCE
Forrest N. Case, Oak Ridge, and Thomas S. Mackey and Clyde E. McFarland, Knoxville, Tenn., assignors to the United States of America as represented by the United States Atomic Energy Commission
No Drawing. Filed Sept. 29, 1967, Ser. No. 671,882
U.S. Cl. 264—.5         4 Claims
Int. Cl. G21c 21/12

ABSTRACT OF THE DISCLOSURE

A beta source comprising strontium-90 microspheres embedded in an aluminum matrix and encased in stainless steel, and a method of making it comprising providing a mixture of strontium-90 silicate microspheres and molten aluminum in a stainless steel container, forcing the molten aluminum into the voids between the microspheres, and cooling the resulting mass.

BACKGROUND OF THE INVENTION

This invention was made in the course of, or under, a contract with the U.S. Atomic Energy Commission.

This invention relates to radiation sources and methods of making them.

Some applications for ionizing radiation, such as polymerization reactions, require that the radiation source withstand temperatures in excess of 600° C. and pressures of about 10,000 p.s.i. One of the useful methods of making $^{90}Sr$ beta sources has been to sorb $^{90}Sr$ onto an exchange material and then to load and seal the exchange material into a capsule. The sources produced by this method have the disadvantages for high-pressure or high-temperature applications that pressure on the capsule will collapse the wall, crushing the powders and causing failure of the capsule, and many of the materials used have significant vapor pressures at high temperatures.

SUMMARY OF THE INVENTION

It is accordingly one object of our invention to provide an improved radiation source and a method of making it.

It is another object to provide a radiation source capable of withstanding elevated temperatures and pressures.

Other objects of our invention will become apparent from the following description and attached claims.

In accordance with our invention we have provided a beta radiation source comprising strontium-90 silicate microspheres disposed within a solid supporting matrix of a first metal encased in a closed container formed of a second metal, said second metal having a higher melting temperature than said first metal. We have also provided a method of making said source comprising the steps of (1) forming strontium-90 silicate microspheres; (2) dispersing said microspheres together with a molten mass of a first metal within a container comprising a second metal, said second metal having a higher melting temperature than said first metal; (3) forcing said molten mass of said first metal into the voids between said strontium-90 silicate microspheres; and (4) cooling and sealing the resulting assembly.

The beta source made in accordance with our method is capable of withstanding pressures in excess of 10,000 p.s.i. and temperatures in excess of 600° C. Inasmuch as strontium-90 is a component of the compound from which the microspheres are formed, the strontium-90 loading can be at least five times greater than can be obtained by conventional sorption methods.

Description of the Preferred Embodiments

The strontium-90 silicate in our beta source is in the shape of microspheres, preferably 100 to 400 microns in diameter. Particles larger than 400 microns have the disadvantages of poor packing, resulting in lower source output, and particles smaller than 100 microns approach the size of dust particles and may cause contamination problems.

In accordance with one aspect of our invention these microspheres are made by mixing an aqueous solution of strontium nitrate with an aqueous solution of a quaternary ammonium silicate. Both solutions must be dilute, the strontium nitrate solution containing 0.01 to 1.0 weight percent and preferably about 0.4 weight percent strontium nitrate and the silicate solution containing 0.1 to 6 weight percent and preferably about 3 weight percent of the quaternary ammonium silicate. The silicate is preferably in excess of the stoichiometric amount by 10 to 50 percent in order to ensure reaction with virtually all the strontium.

Any water-soluble quaternary ammonium silicate may be used to react with the strontium nitrate.

The strontium silicate precipitate is calcined to form crystalline $SrSiO_3$, the product is melted to consolidate the particles, the particles are crushed, and the crushed particles are dropped through a heated zone maintained at a temperature high enough to melt the particles and form microspheres.

The resulting microspheres are embedded in a matrix of a metal having a relatively low melting point and the matrix is encased within a higher melting point metal. The matrix metal must have a melting point lower than the case metal and it must also have a low mass in order to provide a source having a high beta output. Aluminum is the preferred matrix metal.

The matrix may be encased in any metal having a melting temperature higher than the matrix metal and capable of withstanding the environment to which the source is to be exposed. Stainless steel is preferred for most applications. The walls of the case should be thick enough to have the structural strength needed during the fabrication steps. Although walls of thinner or thicker material may be used, typically the thickness will be in the range of 5 to 10 mils.

Our radiation source is not limited to any specific size or shape, and its configuration may be determined by use requirements. The source will preferably have its shortest dimension from four to five times the diameter of the microspheres to be used. Sources having the shortest dimension larger than about 85 mils have the disadvantage of being inefficient because of self-shielding.

The method of making our beta source is described below with the preferred metals aluminum as a matrix metal and stainless steel as the encapsulating metal.

In our method of making the source the strontium-90 silicate microspheres are disposed within a stainless steel tube together with aluminum. This assembly is heated to a temperature high enough to melt the aluminum and the molten aluminum is forced throughout voids between spherical particles of the silicate. The molten aluminum must be infiltrated into the voids by a method which does not crush the microspheres, and we have found that either centrifugal or vacuum techniques may be used. The resulting assembly is then cooled and the stainless steel tube is sealed.

The following examples are offered to illustrate our invention in more detail.

EXAMPLE I

Strontium silicate was prepared by mixing an aqueous solution of strontium nitrate with an aqueous solution of methyl triethanol ammonium silicate containing 15 percent excess $SiO_2$. The $SrSiO_3$ precipitate thus formed was washed, dried, and calcined to form crystalline $SrSiO_3$ at approximately 1,750° C. The bulk pieces of glass-like $SrSiO_3$ were crushed to produce particles in the range 6 to 12 mils diameter. The crushed particles were permitted to free-fall through an 1,800° C. temperature zone, two feet long, where fusion and spheroidization occurred.

A simulated beta source was prepared by loading 1,180 milligrams of the $SrSiO_3$ spheres into a section of rectangular 10-mil stainless steel tubing ⅜ inch by 0.040 inch having one end welded closed. A section of aluminum metal weighing 825 milligrams was inserted into the source assembly on top of the loose spheres. The source assembly was placed in a stainless steel centrifuge tube and the area around the source assembly filled with sea sand. This entire unit was heated to 800° C. and centrifuged for about 10 minutes until the unit had cooled below the melting point of aluminum. The rectangular tube was sheared at a point just above the strontium silicate fill and given a final weld seal.

The resulting beta source was tested to determine its integrity. The source resisted shear loads in excess of 1,000 pounds for one hour and could be bent to form spirals and circles without failure. The source behaved substantially like a solid bar.

Sectioning of the source established that the cladding was completely filled with aluminum-bonded $SrSiO_3$ spheres.

The following example is offered to illustrate another method of forcing the molten aluminum into the interstices between the microspheres.

EXAMPLE II

An assembly of $SrSiO_3$ microspheres within a double open-ended tube was prepared and a fritted quartz filter was placed at one end to retain the microspheres within the tube. The end with the filter was attached to a pump and the other end was inserted in a pool of molten aluminum. The molten aluminum was drawn into the tube, the resulting assembly was cooled and cut to length, and the ends were welded shut.

The above examples are offered only to illustrate our invention, which should be limited only in accordance with the following claims.

We claim:
1. A method of fabricating a radiation source from strontium-90 silicate microspheres comprising the steps of:
   (a) dispersing said microspheres together with a molten mass of a first metal within a container comprising a second metal, said second metal having a higher melting temperature than said first metal;
   (b) forcing said molten mass of said first metal into the voids between said strontium-90 silicate microspheres; and
   (c) cooling and sealing the resulting assembly.
2. The method of claim 1 wherein the first metal is aluminum and the second metal is stainless steel.
3. The method of claim 1 wherein said molten mass is forced into the voids between said microspheres by centrifuging the assembly of said container, microspheres, and molten mass.
4. The method of claim 1 wherein said molten mass is forced into the voids between said microspheres by evacuating the interstitial zone between said microspheres and permitting said molten mass to flow into the resulting evacuated zone.

References Cited

UNITED STATES PATENTS

| | | | |
|---|---|---|---|
| 3,161,504 | 12/1964 | Black et al. | 264—.5 X |
| 3,324,540 | 6/1967 | Lotts et al. | 264—.5 X |
| 3,330,889 | 7/1967 | Samos et al. | 264—.5 |
| 3,331,784 | 7/1967 | Meyer et al. | 264—.5 X |

CARL Q. QUARFORTH, *Primary Examiner.*

MELVIN J. SCOLNICK, *Assistant Examiner.*

U.S. Cl. X.R.

252—301.1; 250—84, 106; 176—89, 91; 29—420